United States Patent [19]

Anderson

[11] 4,188,291
[45] *Feb. 12, 1980

[54] TREATMENT OF INDUSTRIAL WASTE WATER

[76] Inventor: Donald R. Anderson, 3062 Blume Dr., Los Alamitos, Calif. 90720

[*] Notice: The portion of the term of this patent subsequent to Jul. 19, 1994, has been disclaimed.

[21] Appl. No.: 894,174

[22] Filed: Apr. 6, 1978

[51] Int. Cl.² .................... C02B 1/20; B01D 13/02; B01D 21/01
[52] U.S. Cl. .................. 210/23 H; 210/45; 210/46; 210/47; 210/53; 203/7; 203/10; 203/26; 203/DIG. 20; 204/180 P
[58] Field of Search .................. 210/23 F, 23 H, 45, 210/46, 47, 49, 51, 52, 53, 56, 71, 72, 73 R, 73 SG, 257 M, 259; 203/7, 26, 10, 36, DIG. 20; 204/180 P; 159/24 R, 24 A, 24 B, DIG. 13, 20

[56] References Cited

U.S. PATENT DOCUMENTS

| | | | |
|---|---|---|---|
| 2,226,592 | 12/1940 | Stern | 210/53 |
| 2,433,458 | 12/1947 | Kahn | 210/53 |
| 2,893,840 | 7/1959 | Vettel | 210/259 |
| 3,262,877 | 7/1966 | Le Compte | 210/53 |
| 3,345,288 | 10/1967 | Sontheimer | 210/52 |
| 3,488,261 | 1/1970 | Loebel | 203/26 |
| 3,597,328 | 8/1971 | Michaels | 203/26 |
| 3,639,231 | 2/1972 | Baesler | 210/30 R |
| 3,676,067 | 7/1972 | Tabata | 203/7 |
| 3,833,463 | 9/1974 | Croom | 210/51 |
| 3,833,464 | 9/1974 | Rolfe | 210/51 |
| 4,017,391 | 4/1977 | Black | 210/52 |
| 4,036,749 | 7/1977 | Anderson | 210/23 H |
| 4,054,493 | 10/1977 | Roller | 159/DIG. 13 |
| 4,059,513 | 1/1977 | Zadera | 210/53 |
| 4,083,781 | 4/1978 | Conger | 210/23 H |

FOREIGN PATENT DOCUMENTS 826770   1/1960   United Kingdom ............... 210/52

Primary Examiner—Charles N. Hart
Assistant Examiner—Ernest G. Therkorn
Attorney, Agent, or Firm—Fulwider, Patton, Rieber, Lee & Utecht

[57] ABSTRACT

A method is disclosed for processing industrial waste waters and, in particular, blow down water from thermal electric plants. The water is processed to concentrate the salts contained therein and to obtain a concentrated brine which can then be passed to a thermal evaporator and/or solar evaporation ponds. The water is processed by the addition of magnesium hydroxide and carbon dioxide in amounts sufficient to precipitate the calcium as calcium carbonate, thereby obtaining a water reduced in calcium content and increased in magnesium content from the industrial waste water. The treated water is processed to recover a purified water from a brine, preferably by reverse osmosis. Calcium hydroxide is added to the brine generated by the reverse osmosis process in an amount sufficient to precipitate magnesium hydroxide therefrom which can be recycled to supply the magnesium hydroxide used in pre-treatment of the water prior to the reverse osmosis process. A clarified brine is recovered from the magnesium hydroxide precipitation step and may then be naturally or thermally evaporated to produce a saturated slurry of salt solids. This slurry can then be further reduced to dryness by solar evaporation.

10 Claims, 1 Drawing Figure

TREATMENT OF INDUSTRIAL WASTE WATER

BACKGROUND OF THE INVENTION

This invention comprises the treatment of water and in particular a treatment for industrial waste waters.

BRIEF STATEMENT OF THE PRIOR ART

Industrial processes and, particularly, electrical power generation plants, require copious quantities of fresh water which is used for cooling and which becomes concentrated during its use, typically in evaporative cooling towers, gas scrubbers, and the like. Traditionally, the water which has been concentrated to a level of incipient salt precipitation has been returned to surface or subterranean water streams. Increasing concern over contamination of the environment, however, has resulted in water quality standards which prohibit the return of water of inferior quality, i.e., higher salt content, than that withdrawn from the watershed. Procedures have been proposed for concentrating the water to a saturated or super-saturated brine, thereby greatly reducing its volume and permitting the brine to be evaporated to dryness in solar evaporation ponds. A promising treatment is vapor compression evaporation wherein hot brine is flashed in a vessel provided with internal tubes and the vapor effluent is withdrawn, compressed and passed through the tubes of the vessel for condensation therein to supply heat for evaporation of the brine. One of the difficulties of this processing is that it has a relatively high power requirement and it is, therefore, imperative for economical processing that the volume of brine processed be reduced to minimal quantities.

It has been proposed to employ reverse osmosis treatment of the waste water to recover a concentrated brine which can be subsequently processed by vapor compression evaporation. The reverse osmosis process, however, has limited tolerance to salts, particularly calcium salts, and efficient processing requires reduction of the calcium content of the waste water processed in the system. Furthermore, industrial waste waters frequently contain appreciable quantities of silica and a method must be provided to reduce the silica content of the waters prior to processing through the reverse osmosis system.

RELATIONSHIP TO MY PRIOR PATENT

My prior patent, U.S. Pat. No. 4,036,749, discloses a water treatment process wherein calcium in water is precipitated as calcium carbonate by the addition of magnesium hydroxide prior to processing through a concentration treatment such as reverse osmosis, distillation, electrodialysis, freezing, vapor compression, ion exchange, and the like. The brine recovered from this treatment is further processed by the addition of calcium hydroxide to precipitate the magnesium present in the water as magnesium hydroxide, which is recovered and recycled to the water treatment stage preceding the concentration treatment.

The patented process affords the advantage of providing the requisite magnesium hydroxide for the water treatment.

BRIEF STATEMENT OF THE INVENTION

This invention comprises processing of industrial waste water by adding magnesium hydroxide and carbon dioxide to the waste water in an amount sufficient to precipitate calcium carbonate therefrom. Industrial waste waters typically have insufficient carbonate or bicarbonate contents to insolublize the calcium upon addition of magnesium hydroxide and addition of carbon dioxide is, therefore, necessary. The addition of the carbon dioxide separately from the addition of magnesium hydroxide also avoids its reaction directly with the magnesium hydroxide which forms a gellatinous mixture which is extremely difficult to handle.

When the waste water contains silica and the subsequent processing cannot tolerate silica as, for instance, reverse osmosis, the invention includes pretreating the water by the addition of calcium hydroxide in an amount sufficient to coprecipitate the silica and magnesium hydroxide. The precipitates are settled to recover a treated water having a substantially reduced calcium content and a higher magnesium content than the untreated waste water. The water is then processed, preferably by reverse osmosis, to obtain a purified water stream and a residual brine. The residual brine, which is enriched in calcium and magnesium content, is treated with calcium hydroxide to precipitate magnesium hydroxide which is recovered and recycled to the water treatment step. The clarified brine from the magnesium hydroxide precipitation step can be processed by vapor compression distillation to obtain a slurry of salt solids in brine suitable for discharging into a solar evaporation pond for reduction to dryness.

BRIEF DESCRIPTION OF THE DRAWINGS

The invention will be described by reference to the FIGURES of which.

DESCRIPTION OF THE PREFERRED EMBODIMENT

Figure 1:
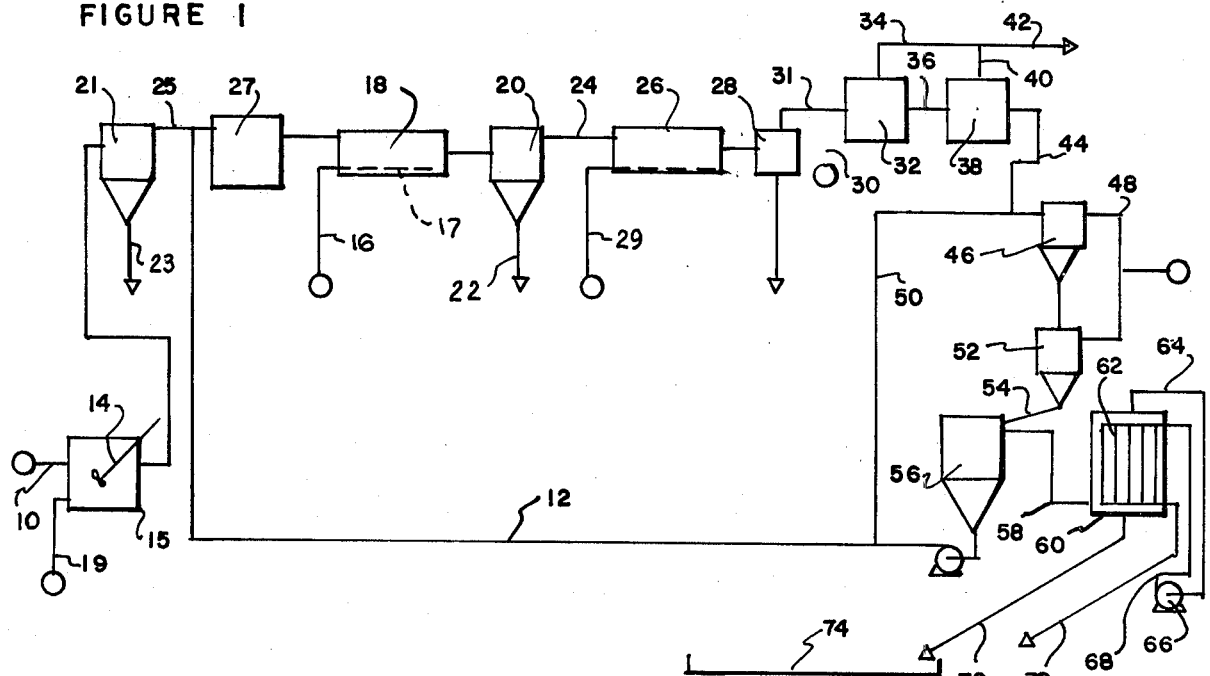
FIG. 1 is a flow chart of the preferred process of the invention.

Referring to FIG. 1, the preferred embodiment of the process is illustrated. In this process, the raw water is introduced through line 10 into contact with calcium hydroxide which is added through line 19. The mixture is thoroughly admixed in vessel 15 having a suitable stirrer 14 and the mixture is passed to a clarifier or settling vessel 21. The calcium hydroxide added through line 19 is sufficient to precipitate magnesium present in the waste water stream 10 as magnesium hydroxide in an amount sufficient to effect the desired removal of silica and, for this purpose, is sufficient to raise the pH of the water to a value of about 10 to about 11.

The magnesium hydroxide and silica co-precipitate and are settled and removed from vessel 21 through line 23, together with other impurities such as calcium fluoride and ferric hydroxide and suspended solids which may be present in the water. The clarified water is removed through line 25 and is admixed with magnesium hydroxide which is introduced through line 12. The magnesium hydroxide is thoroughly admixed with the water in mixing vessel 27 and the stream is then contacted with carbon dioxide which is introduced through line 16 to sparging tubes 17 in vessel 18 in a quantity sufficient to supply the carbonate requirements for precipitation of a substantial amount of the calcium as calcium carbonate. The mixture is agitated by the bubbling of carbon dioxide into mixing vessel 18 and, if desired, by mechanical mixing. The treated water is then passed to a clarifier or settling vessel 20. A suitable apparatus for effecting the carbon dioxde addition is submerged combustion wherein a fuel such as natural gas is burned and the resultant flue gases are released into the water through an immersed "dip tube" or "downcomer".

The calcium carbonate precipitate is separated in the vessel 20 and is removed through line 22 while the clarified water is removed through line 24 and can be contacted with carbon dioxide or a mineral acid introduced through line 29 in a quantity sufficient to reduce the pH of the water from a value of about 10 to 11 to a value that effects precipitation of the aluminum in the water as aluminum hydroxide. This can be a value from about 5.5 to 8.0. The aluminum hydroxide is removed by filter 28 while the filtrate is passed through line 31 and is contacted with sulfuric acid introduced through line 30 at a quantity sufficient to reduce the pH of the water to a value of about 5 to 6 for processing through the reverse osmosis unit.

The treated water is passed to reverse osmosis processing which can comprise a first reverse osmosis unit 32 that produces a first purified water stream 34 and a first brine or concentrated salt solution 36. The latter is sent to a second reverse osmosis unit 38 producing a second purified water stream 40 which is combined with the first purified water stream 34 and withdrawn from the process at 42 as a purified water stream.

The brine resulting from the reverse osmosis processing is removed through line 44 and is passed to mixing vessel 46 where it is contacted with a calcium hydroxide stream introduced through line 48 and a recycle stream of a slurry of magnesium hydroxide through line 50. The calcium hydroxide is introduced through line 48 in a quantity sufficient to precipitate the magnesium from the brine as magnesium hydroxide and this precipitation occurs in first and second reaction vessels 46 and 52 which provide a residence time from 10 to about 30, preferably from 15 to about 20, minutes for adequate crystal growth. The brine containing the magnesium hydroxide precipitate is then passed through line 54 to a thickener 56, which is a vessel that permits settling of the precipitate and withdrawal of a clarified liquid through line 58. Some of the magnesium hydroxide precipitate recovered from vessel 56 can be recycled through line 12 to supply the magnesium hydroxide required for the calcium carbonate precipitation.

The brine removed from the settling vessel 56 is passed through line 58 to a vapor compression evaporation treatment. The vapor compression process employs a flash evaporation vessel 60 having an internal, tubular heat exchanger 62. The brine is flashed within vessel 60 and the vapor is removed through line 64 and passed to a compressor 66 where it is raised in pressure approximately 5–20 psi. The compressed steam is returned through line 68 to the tubular heat exchanger 62, condensing therein to provide heat for boiling of the brine contained within vessel 60. The condensed steam is removed through line 70 and a highly concentrated brine or a slurry of salts in brine can be removed through line 72 and passed to a solar evaporation pond 74.

In the aforedescribed process, the amount of magnesium hydroxide added to the water from line 12 is sufficient to raise the pH of the water to a value from 9 to about 10. This amount of magnesium hydroxide typically comprises from 0.05 to about 10 weight percent of the water and is sufficient to precipitate, after the addition of carbon dioxide, from 10 to about 98 percent of the calcium present in the feed water. The amount of carbon dioxide added is sufficient to supply the necessary carbonate for reaction with the calcium present in the feed water. The addition of the carbon dioxide reduces the pH of the water somewhat, typically about 1 to about 2 pH units, so that the pH of the water removed from the mixing vessel 18 is about 8 to 9.

The amount of calcium hydroxide added through line 19 should be sufficient to co-precipitate the magnesium hydroxide and silica. The amount of this addition varies with the amounts of silica and magnesium present in the waste water in the manner described hereinafter with reference to FIG. 3.

The amount of calcium hydroxide introduced into contact with the brine from the reverse osmosis processing through line 48 is sufficient to raise the pH of the brine to a value from 10 to about 11 preferably about 10.5. This amount will vary depending on the composition and concentration of impurities in the brine but generally is from 2 to about 15 weight percent of the brine. The precipitation of the magnesium hyroxide is facillated by recycling a portion of the separated magnesium hydroxide through line 45 to serve as a source of seed crystals for the magnesium hydroxide precipitate in the mixing vessels 46 and 52. Generally the residence time of the brine in vessels 46 and 52 is from 10 to about 20 minutes, preferably about 15 minutes, and this time is sufficient to permit appreciable crystal growth of the magnesium hydroxide, thereby facillitating the subsequent settling of the magnesium hydroxide in the thickener vessel 56.

Figure 2:
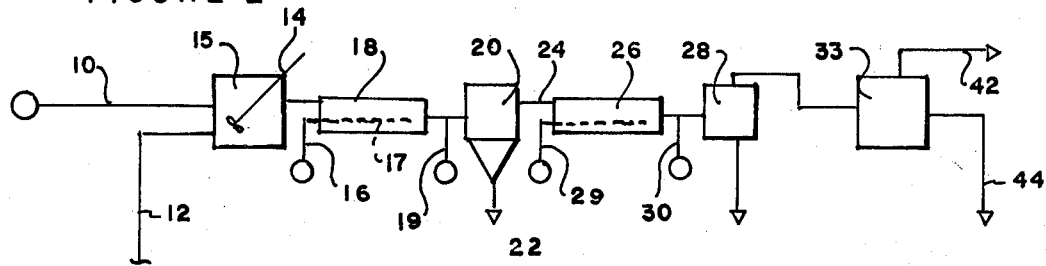
FIG. 2 is a flow chart of an alternative embodiment of the invention.

Referring now to FIG. 2, an alternative embodiment is shown. The industrial waste water is introduced to the process through line 10 where it is contacted with magnesium hydroxide supplied through line 12 to vessel 15 and stirred by mixer 14 and the like to thoroughly admix the streams. The addition of the magnesium hydroxide raises the pH of the water to a value from about 9 to about 10 and the resultant stream is then contacted with carbon dioxide which is introduced through line 16 and discharged into vessel 18 by sparger 17. The resultant mixture removed from vessel 18 is contacted with a stream of calcium hydroxide which is added through line 19. Calcium hydroxide is added to the stream in a quantity sufficient to precipitate magnesium hydroxide therefrom and this precipitation is accompanied by the coprecipitation of the silica in the waste water.

The magnesium hydroxide added through line 12 and the carbon dioxide introduced through sparger 17 are sufficient to precipitate a substantial quantity of the calcium present in the waste water as calcium carbonate. The magnesium hydroxide can be added in a slight excess, sufficient to insure that the silica remains as a precipitate after the carbonation step. The precipitates are separated in a reactor-clarifier 20 and can be removed as a solid or slurry through line 22. A clarified water stream is removed through line 24 and is admixed with further quantities of carbon dioxide sufficient to reduce the alkalinity of the water to neutral, i.e., adjust the pH to about 7.

The combined carbon dioxide and water are passed through another mixing device 26 to thorough contacting and the streams are then passed to a filter 28 which removes insoluble aluminum hydroxide which precipitates at a neutral pH value. A mineral acid can be added to the filtrate water removed through line 30 to reduce the pH of the water to a value from 5 to about 6, rendering it suitable for processing through the reverse osmosis units. The reverse osmosis unit is illustrated as a single unit 33 which can, of course, comprise the serially connected units as described in FIG. 1. This unit produces a purified water stream 42 and a brine stream 44. The brine stream is passed to subsequent processing such as the magnesium hydroxide reactors 46 and 52 described in FIG. 1 to obtain the magnesium hydroxide stream which is introduced through line 12 to contact the waste water. The remainder of the processing of the FIG. 2 embodiment is the same as that described with reference to FIG. 1.

Figure 3:
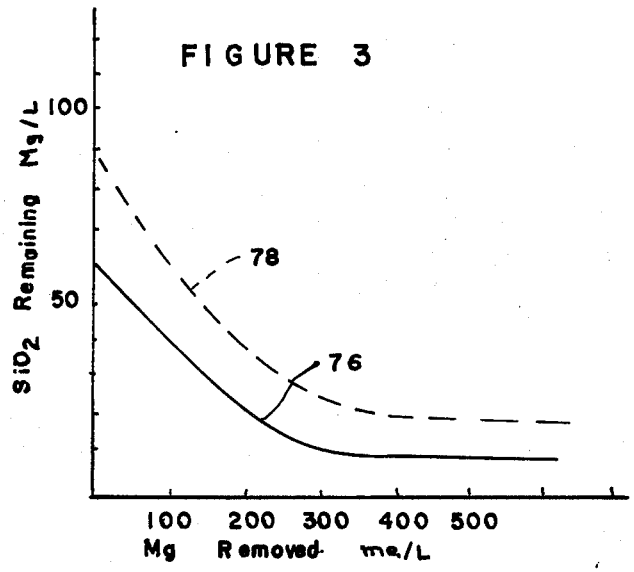
FIG. 3 is a graphical illustration of the effectiveness of magnesium hydroxide precipitation in the removal of silica from industrial waste water.

Referring now to FIG. 3, there is shown two curves illustrating the effectiveness of silica removal with calcium hydroxide addition to a waste water containing magnesium salts. The curves are plotted as concentrations of silica remaining in treated water against the amount of magnesium removed from the water after the preliminary treatment step. A series of curves such as 76 and 78 can be obtained representing the removal of the silica, each of the curves representing successively higher concentrations of silica in the waste water.

The invention will be described by the following examples which will serve to demonstrate the results obtainable by the invention.

EXAMPLE 1

The invention is applied to a process with the flow chart as shown by FIG. 1. As illustrated, the waste water having the composition of Table 1, is supplied through line 10, at a flow rate of 3000 gallons per minute.

Table 1

| Component | PPM |
| --- | --- |
| $Na^+$ | 2995 |
| $Ca^{++}$ | 850 |
| $Mg^{++}$ | 365 |
| $Fe^{++}$ | 5 |
| $Al^{+++}$ | 5 |
| $Cl^-$ | 2353 |
| $SO_4^{32}$ | 6388 |
| $F^-$ | 5 |
| $HCO_3^-$ | 196 |
| $CO_3^=$ | 5 |
| $SiO_2$ | 130 |
| $CO_2$ | 50 |
| pH | 8.4 |

Calcium hydroxide is introduced through line 19 at a flow rate of 828 pounds per hour and this results in the precipitation of magnesium hydroxide and removal of silica together with other impurities in the quantities indicated in the following table:

Table 2

| Precipitate | Quantity (lbs. per hour) |
| --- | --- |
| Magnesium Hydroxide | 719 |
| Silica | 360 |
| Calcium Fluoride | 30 |
| Ferric Hydroxide | 15 |
| Calcium Carbonate | 495 |

The water removed from the clarification vessel 21 has composition set forth in the following table:

Table 3

| Sample | PPM |
| --- | --- |
| $Na^+$ | 2995 |
| $Ca^{++}$ | 1112 |
| $Mg^{++}$ | 165 |
| $Cl^-$ | 2353 |
| $SO_4^=$ | 6388 |
| $HCO_3^-$ | Trace |
| $CO_3^=$ | Trace |

The water is admixed with magnesium hydroxide introduced through line 12 at a flow rate of 2720 pounds per hour and carbon dioxide is introduced through line 16 at a flow rate of 2050 pounds per hour, sufficient to convert the calcium to calcium carbonate which is settled and removed through line 22 at a rate of 4290 pounds per hour. The clarified water removed through line 24 has a composition set forth in Table 4.

Table 4

| Component | PPM |
| --- | --- |
| $Na^+$ | 3082 |
| $Ca^{++}$ | 75 |
| $Mg^{++}$ | 920 |
| $Al^{+++}$ | 5 |
| $Cl^-$ | 2420 |
| $SO_4$ | 6975 |
| $F^-$ | Trace |
| Carbonate Alkalinity as $CaCO_3$ | 250 |
| pH | 8.5 |

The water in line 24 is admixed with carbon dioxide, added through line 29 at a rate of 20 pounds per hour, to lower the pH of the water to about 7.0, precipitating the aluminum.

The filter removes 7 pounds per hour of aluminum hydroxide from the water. Sulfuric acid is introduced through line 30 at a rate of 294 pounds per hour and this is sufficient to reduce the pH of the water to 5.5.

The purified water recovered from the reverse osmosis process at a rate of 2400 gallons per minute through line 42 has the following composition:

Table 5

| Sample | PPM |
| --- | --- |
| $Na^+$ | 261 |
| $Ca^{++}$ | 4 |
| $Mg^{+++}$ | 23 |
| $Fe^{+++}$ | Trace |
| $Al^{+++}$ | Trace |
| $Cl^-$ | 242 |
| $SO_4^=$ | 304 |
| $F^-$ | 0 |
| Carbonate Alakalinity as $CaCO_3$ | 30 |
| $SiO_2$ | Trace |

The brine removed from the reverse osmosis unit through line 44 has the composition shown in Table 6. This brine is produced at a rate of 600 gallons per minute.

Table 6

| Sample | PPM |
| --- | --- |
| $Na^+$ | 14366 |
| $Ca^{++}$ | 375 |
| $Mg^{+++}$ | 4511 |
| $Fe^{+++}$ | Trace |
| $Al^{+++}$ | Trace |

Table 6-continued

| Sample | PPM |
|---|---|
| Cl⁻ | 11134 |
| SO₄⁼ | 33660 |
| F⁻ | Trace |
| Carbonate Alkalinity as CaCO₃ | 200 |

Calcium hydroxide is introduced into contact with the brine through line 48 at a rate of 2650 pounds per hour and the crystallization of magnesium hydroxide in the reactors 46 and 52 is assisted by recycling of 200 gallons per minute of magnesium hydroxide precipitant removed from the settling vessel 56. The clarified brine, reduced in magnesium content which is passed through line 58 to the vapor compression evaporation process has a flow rate of 600 gallons per minute and the composition as set forth in Table 7.

Table 7

| Sample | PPM |
|---|---|
| Na⁺ | 14895 |
| Ca⁺⁺⁺ | 2828 |
| Mg⁺⁺⁺ | 80 |
| Fe⁺⁺⁺ | Trace |
| Al⁺⁺⁺ | Trace |
| Cl⁻ | 11528 |
| SO₄⁼ | 22435 |
| F⁻ | Trace |
| Carbonate Alakalinity as CaCO₃ | 100 |

The brine is concentrated in this evaporative evaporation to produce a slurry saturated in dissolved salts and containing approximately 30 weight percent of salt crystals. This slurry is passed through line 72 to solar evaporation ponds.

The application of the method of this invention to the treatment of the waste water stream can be seen to have reduced the volume of the stream from 3000 gallons per minute to 600 gallons per minute of a salt slurry supplied to the solar evaporation ponds. The process recovers purified water through lines 42 and 70 at a combined flow rate of 2400 gallons per minute. The use of the invention including the reverse osmosis pre-treatment of the water to the vapor compressor evaporator reduces the volume of liquid charged to this salt concentration step from 3000 to 600 gallons per minute and effects a very substantial savings in operating costs.

The invention has been described with reference to the presently preferred embodiments thereof. It is not intended that the invention be unduly limited by this disclosure. Instead, it is intended that the invention be defined by the method steps, and their obvious equivalents set forth in the following claims.

What is claimed is:

1. A method for processing industrial waste water containing magnesium and calcium salts which comprises:
    (a) adding magnesium hydroxide and gaseous carbon dioxide to the waste water in an amount sufficient to precipitate calcium carbonate in the water;
    (b) settling the precipitates in said water and recovering a treated water having substantially reduced calcium content and a higher magnesium salt content than said waste water;
    (c) processing the treated water by reverse osmosis, distillation, electrodialysis or freezing to obtain a purified water and a residual brine enriched in calcium and magnesium contents;
    (d) adding calcium hydroxide to at least a portion of said brine in an amount sufficient to precipitate magnesium hydroxide therefrom;
    (e) separating said magnesium hydroxide from said brine; and
    (f) returning said magnesium hyroxide for addition to said waste water in the aforesaid precipitation of calcium carbonate.

2. The method of claim 1 wherein said treated water is processed by reverse osmosis and including the step of adding calcium hydroxide to the waste water in an amount sufficient to coprecipitate magnesium hydroxide and silica in the water prior to the addition of magnesium hydroxide and carbon dioxide.

3. The method of claim 2 wherein clarified water is recovered from the magnesium hydroxide and silica coprecipitants prior to addition of the magnesium hydroxide.

4. The method of claim 3 wherein said industrial waste water also contains one or both of ferric and fluoride salts which are also coprecipitated with said magnesium hydroxide and silica as ferric hydroxide and calcium fluoride, respectively.

5. The method of claim 1 which comprises adding carbon dioxide to the treated water from step (b) in an amount sufficient to neutralize the treated water to a pH of about 5.5 to 8.0.

6. The method of claim 5 wherein said industrial waste water also contains aluminum salts and comprising the futher step of separating aluminum hydroxide from the neutralized treated water.

7. The method of claim 6 wherein said treated waste water is processed by reverse osmosis and including the addition of a mineral acid to adjust the pH of said water from 5 to about 6 before said processing by reverse osmosis.

8. The method of claim 1 including the step of processing said brine after separation of said magnesium hydroxide by vapor compression evaporation to cocentrate said brine to a slurry of salt solids.

9. The method of claim 8 wherein said industrial waste water is from an electrical power generation plant blow down stream.

10. The method of processing waste water from an electrical power generation plant which comprises:
    (a) adding calcium hydroxide to the waste water in an amount sufficient to coprecipitate magnesium hydroxide and silica in the water;
    (b) adding magnesium hydroxide and gaseous carbon dioxide to the waste water in an amount sufficient to precipitate calcium carbonate in the water;
    (c) settling the precipitates in said water and recovering a treated water having substantially reduced silica and calcium contents and a higher magnesium salt content than said waste water;
    (d) processing the treated water by reverse osmosis, distillation, electrodialysis or freezing to obtain a purified water and a residual brine enriched in calcium and magnesium contents;
    (e) adding calcium hydroxide to at least a portion of said brine in an amount sufficient to precipitate magnesium hydroxide therefrom;
    (f) separating said magnesium hydroxide from said brine;
    (g) returning said magnesium hydroxide for addition to said waste water in the aforesaid precipitation of calcium carbonate; and
    (h) processing said brine from step (f) by vapor compression evaporation to concentrate said brine to a slurry of salt solids.

* * * * *